(12) United States Patent
Garg et al.

(10) Patent No.: US 8,145,221 B2
(45) Date of Patent: Mar. 27, 2012

(54) RADIO NETWORK COMMUNICATION

(75) Inventors: Deepak Garg, Nashua, NH (US); Douglas Norman Knisely, Wheaton, IL (US); Prasasth R. Palnati, Westford, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 432 days.

(21) Appl. No.: 11/303,774

(22) Filed: Dec. 16, 2005

(65) Prior Publication Data

US 2007/0140185 A1 Jun. 21, 2007

(51) Int. Cl.
*H04W 36/00* (2009.01)
*H04W 4/00* (2009.01)

(52) U.S. Cl. .................. 455/444; 455/436; 370/338

(58) Field of Classification Search .................. 455/509, 455/464, 67.11, 411, 453, 67.13, 444, 436, 455/446, 449, 517, 524, 450, 451, 452, 455, 455/512, 440, 452.1, 437, 438, 439, 441, 455/442, 443, 452.2, 445, 447; 370/338, 370/469, 237, 343, 453, 392, 329, 252, 310, 370/520, 401, 450, 452.2, 241, 408, 328, 370/235, 230.1, 331, 260, 389, 254, 340, 370/336, 242, 232
See application file for complete search history.

(56) References Cited

U.S. PATENT DOCUMENTS

| | | |
|---|---|---|
| 5,128,938 A | 7/1992 | Borras |
| 5,239,675 A | 8/1993 | Dudczak |
| 5,377,224 A | 12/1994 | Hudson |
| 5,574,996 A | 11/1996 | Raith |
| 5,754,945 A | 5/1998 | Lin et al. |
| 5,790,528 A | 8/1998 | Muszynski |
| 5,815,813 A | 9/1998 | Faruque |
| 5,828,661 A | 10/1998 | Weaver et al. |
| 5,852,630 A | 12/1998 | Langberg et al. |
| 5,857,154 A | 1/1999 | Laborde et al. |
| 5,884,177 A | 3/1999 | Hanley |
| 5,930,714 A | 7/1999 | Abu-Amara et al. |
| 5,937,345 A | 8/1999 | McGowan et al. |
| 5,940,762 A | 8/1999 | Lee et al. |
| 5,960,349 A | 9/1999 | Chheda |
| 5,974,318 A | 10/1999 | Satarasinghe |
| 5,983,282 A | 11/1999 | Yucebay |
| 5,991,635 A | 11/1999 | Dent et al. |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |

(Continued)

FOREIGN PATENT DOCUMENTS

AU 1998/72855 12/1998

(Continued)

OTHER PUBLICATIONS

*International Search Report*, Patent Cooperation Treaty, Oct. 26, 2006, 6 pages.

(Continued)

*Primary Examiner* — Melody Mehrpour
(74) *Attorney, Agent, or Firm* — Fish & Richardson P.C.

(57) ABSTRACT

Techniques for enabling a radio access network to cause an access terminal in communication with the radio access network to send an update including information about a location of the access terminal.

20 Claims, 3 Drawing Sheets

U.S. PATENT DOCUMENTS

| | | | |
|---|---|---|---|
| 6,032,033 | A | 2/2000 | Morris et al. |
| 6,047,186 | A | 4/2000 | Yu et al. |
| 6,049,715 | A | 4/2000 | Willhoff et al. |
| 6,052,594 | A | 4/2000 | Chuang et al. |
| 6,061,560 | A | 5/2000 | Saboorian et al. |
| 6,069,871 | A | 5/2000 | Sharma et al. |
| 6,091,953 | A | 7/2000 | Ho et al. |
| 6,101,394 | A | 8/2000 | Illidge |
| 6,111,857 | A | 8/2000 | Soliman et al. |
| 6,112,089 | A | 8/2000 | Satarasinghe |
| 6,119,024 | A | 9/2000 | Takayama |
| 6,122,513 | A | 9/2000 | Bassirat |
| 6,151,512 | A | 11/2000 | Chheda et al. |
| 6,167,036 | A | 12/2000 | Beven |
| 6,178,328 | B1 | 1/2001 | Tang et al. |
| 6,192,246 | B1 | 2/2001 | Satarasinghe |
| 6,198,719 | B1 | 3/2001 | Faruque et al. |
| 6,198,910 | B1 | 3/2001 | Hanley |
| 6,208,615 | B1 | 3/2001 | Faruque et al. |
| 6,219,539 | B1 | 4/2001 | Basu et al. |
| 6,223,047 | B1 | 4/2001 | Ericsson |
| 6,233,247 | B1 | 5/2001 | Alami et al. |
| 6,252,862 | B1 | 6/2001 | Sauer et al. |
| 6,256,300 | B1 | 7/2001 | Ahmed et al. |
| 6,266,529 | B1 | 7/2001 | Chheda |
| 6,272,148 | B1 | 8/2001 | Takagi et al. |
| 6,285,875 | B1 | 9/2001 | Alajoki et al. |
| 6,289,220 | B1 | 9/2001 | Spear |
| 6,320,898 | B1 | 11/2001 | Newson et al. |
| 6,345,185 | B1 | 2/2002 | Yoon et al. |
| 6,366,961 | B1 | 4/2002 | Subbiah et al. |
| 6,370,357 | B1 | 4/2002 | Xiao et al. |
| 6,370,381 | B1 | 4/2002 | Minnick et al. |
| 6,393,482 | B1 | 5/2002 | Rai et al. |
| 6,400,712 | B1 | 6/2002 | Phillips |
| 6,404,754 | B1 | 6/2002 | Lim |
| 6,408,182 | B1 | 6/2002 | Davidson et al. |
| 6,418,306 | B1 | 7/2002 | McConnell |
| 6,424,834 | B1 | 7/2002 | Chang et al. |
| 6,430,168 | B1 | 8/2002 | Djurkovic et al. |
| 6,438,376 | B1 | 8/2002 | Elliott et al. |
| 6,438,377 | B1 | 8/2002 | Savolainen |
| 6,445,922 | B1 | 9/2002 | Hiller et al. |
| 6,459,696 | B1 | 10/2002 | Carpenter et al. |
| 6,473,399 | B1 | 10/2002 | Johansson et al. |
| 6,477,159 | B1 | 11/2002 | Yahagi |
| 6,480,476 | B1 | 11/2002 | Willars |
| 6,480,718 | B1 | 11/2002 | Tse |
| 6,507,741 | B1 | 1/2003 | Bassirat |
| 6,522,885 | B1 | 2/2003 | Tang et al. |
| 6,539,030 | B1 | 3/2003 | Bender et al. |
| 6,542,481 | B2 | 4/2003 | Foore et al. |
| 6,542,752 | B1 | 4/2003 | Illidge |
| 6,545,984 | B1 | 4/2003 | Simmons |
| 6,560,453 | B1 | 5/2003 | Henry et al. |
| 6,580,699 | B1 | 6/2003 | Manning et al. |
| 6,590,879 | B1 | 7/2003 | Huang et al. |
| 6,611,695 | B1 | 8/2003 | Periyalwar |
| 6,618,585 | B1 | 9/2003 | Robinson et al. |
| 6,621,811 | B1 | 9/2003 | Chang et al. |
| 6,628,637 | B1 | 9/2003 | Li et al. |
| 6,651,105 | B1 | 11/2003 | Bhagwat et al. |
| 6,687,237 | B1 | 2/2004 | Lee et al. |
| 6,701,148 | B1 | 3/2004 | Wilson et al. |
| 6,701,149 | B1 | 3/2004 | Sen et al. |
| 6,711,144 | B1 | 3/2004 | Kim et al. |
| 6,731,618 | B1 | 5/2004 | Chung et al. |
| 6,738,625 | B1 | 5/2004 | Oom et al. |
| 6,741,862 | B2 | 5/2004 | Chung et al. |
| 6,754,191 | B1 | 6/2004 | Paranchych et al. |
| 6,757,319 | B1 | 6/2004 | Parsa et al. |
| 6,768,903 | B2 | 7/2004 | Fauconnier et al. |
| 6,771,962 | B2 | 8/2004 | Saifullah et al. |
| 6,781,999 | B2 | 8/2004 | Eyuboglu et al. |
| 6,813,498 | B1 | 11/2004 | Durga et al. |
| 6,826,402 | B1 | 11/2004 | Tran |
| 6,834,050 | B1 | 12/2004 | Madour et al. |
| 6,842,630 | B2 | 1/2005 | Periyalwar |
| 6,847,821 | B1 | 1/2005 | Lewis et al. |
| 6,877,104 | B1 | 4/2005 | Shimono |
| 6,909,887 | B2 | 6/2005 | Fauconnier et al. |
| 6,944,452 | B2 | 9/2005 | Coskun et al. |
| 6,975,869 | B1 | 12/2005 | Billon |
| 6,996,056 | B2 | 2/2006 | Chheda et al. |
| 6,999,784 | B1 | 2/2006 | Choi et al. |
| 7,035,636 | B1 | 4/2006 | Lim et al. |
| 7,042,858 | B1 | 5/2006 | Ma et al. |
| 7,047,009 | B2 | 5/2006 | Laroia et al. |
| 7,072,663 | B2 * | 7/2006 | Ramos et al. ............... 455/453 |
| 7,079,511 | B2 | 7/2006 | Abrol et al. |
| 7,085,251 | B2 | 8/2006 | Rezaiifar |
| 7,110,785 | B1 | 9/2006 | Paranchych et al. |
| 7,130,626 | B2 | 10/2006 | Bender et al. |
| 7,130,668 | B2 | 10/2006 | Chang et al. |
| 7,139,575 | B1 | 11/2006 | Chen et al. |
| 7,162,247 | B2 * | 1/2007 | Baba et al. ................. 455/446 |
| 7,170,871 | B2 | 1/2007 | Eyuboglu et al. |
| 7,177,650 | B1 | 2/2007 | Reiger et al. |
| 7,200,391 | B2 | 4/2007 | Chung et al. |
| 7,212,822 | B1 | 5/2007 | Vicharelli et al. |
| 7,236,764 | B2 | 6/2007 | Zhang et al. |
| 7,242,958 | B2 | 7/2007 | Chung et al. |
| 7,251,491 | B2 * | 7/2007 | Jha ........................... 455/441 |
| 7,277,446 | B1 | 10/2007 | Abi-Nassif et al. |
| 7,298,327 | B2 | 11/2007 | Dupray et al. |
| 7,299,168 | B2 | 11/2007 | Rappaport et al. |
| 7,299,278 | B2 | 11/2007 | Ch'ng |
| 7,349,699 | B1 | 3/2008 | Kelly et al. |
| 7,398,087 | B1 * | 7/2008 | McConnell et al. ....... 455/435.1 |
| 7,408,887 | B2 | 8/2008 | Sengupta et al. |
| 7,408,901 | B1 | 8/2008 | Narayanabhatla |
| 7,411,996 | B2 | 8/2008 | Kim et al. |
| 7,453,912 | B2 | 11/2008 | Laroia et al. |
| 7,457,265 | B2 | 11/2008 | Julka et al. |
| 7,486,696 | B2 | 2/2009 | Garg et al. |
| 7,512,110 | B2 | 3/2009 | Sayeedi et al. |
| 7,546,124 | B1 | 6/2009 | Tenneti et al. |
| 7,751,835 | B2 | 7/2010 | Sharma et al. |
| 7,751,858 | B2 | 7/2010 | Chou |
| 2002/0025820 | A1 | 2/2002 | Fauconnier et al. |
| 2002/0031107 | A1 | 3/2002 | Li et al. |
| 2002/0032034 | A1 | 3/2002 | Tiedemann et al. |
| 2002/0035699 | A1 | 3/2002 | Crosbie |
| 2002/0104399 | A1 | 3/2002 | Ma et al. |
| 2002/0067707 | A1 | 6/2002 | Morales et al. |
| 2002/0068570 | A1 | 6/2002 | Abrol et al. |
| 2002/0082018 | A1 | 6/2002 | Coskun |
| 2002/0085719 | A1 | 7/2002 | Crosbie |
| 2002/0102976 | A1 * | 8/2002 | Newbury et al. ............... 455/436 |
| 2002/0136226 | A1 | 9/2002 | Christoffel et al. |
| 2002/0145990 | A1 | 10/2002 | Sayeedi |
| 2002/0193110 | A1 | 12/2002 | Julka et al. |
| 2002/0196749 | A1 | 12/2002 | Eyuboglu et al. |
| 2003/0003913 | A1 | 1/2003 | Chen et al. |
| 2003/0438748 | | 1/2003 | Zhang et al. |
| 2003/0026240 | A1 | 2/2003 | Eyuboglu et al. |
| 2003/0031201 | A1 | 2/2003 | Choi |
| 2003/0067970 | A1 | 4/2003 | Kim et al. |
| 2003/0095513 | A1 | 5/2003 | Woodmansee et al. |
| 2003/0100311 | A1 | 5/2003 | Chung et al. |
| 2003/0469105 | | 5/2003 | Zhang et al. |
| 2003/0114162 | A1 | 6/2003 | Chheda et al. |
| 2003/0117948 | A1 | 6/2003 | Ton et al. |
| 2003/0125039 | A1 | 7/2003 | Lachtar et al. |
| 2003/0195016 | A1 | 10/2003 | Periyalwar |
| 2004/0008649 | A1 | 1/2004 | Wybenga et al. |
| 2004/0015607 | A1 | 1/2004 | Bender et al. |
| 2004/0038700 | A1 | 2/2004 | Gibbs |
| 2004/0068668 | A1 | 4/2004 | Lor et al. |
| 2004/0081111 | A1 | 4/2004 | Bae et al. |
| 2004/0179492 | A1 | 9/2004 | Zhang et al. |
| 2004/0203771 | A1 | 10/2004 | Chang et al. |
| 2004/0214574 | A1 | 10/2004 | Eyuboglu et al. |
| 2004/0218556 | A1 | 11/2004 | Son et al. |
| 2004/0224687 | A1 | 11/2004 | Rajkotia |
| 2005/0021616 | A1 | 1/2005 | Rajahalme et al. |
| 2005/0648187 | | 1/2005 | Schmidt et al. |

| | | |
|---|---|---|
| 2005/0025116 A1 | 2/2005 | Chen et al. |
| 2005/0053034 A1 | 3/2005 | Chiueh |
| 2005/0111429 A1 | 5/2005 | Kim et al. |
| 2005/0113117 A1* | 5/2005 | Bolin et al. ............... 455/456.6 |
| 2005/0124343 A1 | 6/2005 | Kubo |
| 2005/0148297 A1* | 7/2005 | Lu et al. ................ 455/3.06 |
| 2005/0181795 A1 | 8/2005 | Mark et al. |
| 2005/0207368 A1 | 9/2005 | Nam |
| 2005/0213555 A1 | 9/2005 | Eyuboglu et al. |
| 2005/0713958 | 9/2005 | Akhtar et al. |
| 2005/0715281 | 9/2005 | Fong |
| 2005/0233746 A1 | 10/2005 | Laroia et al. |
| 2005/0728848 | 10/2005 | Novak et al. |
| 2005/0243749 A1 | 11/2005 | Mehrabanzad et al. |
| 2005/0245279 A1 | 11/2005 | Mehrabanzad et al. |
| 2005/0751848 | 12/2005 | Fong |
| 2006/0758743 | 1/2006 | Novak et al. |
| 2006/0030323 A1 | 2/2006 | Ode et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0126554 A1 | 6/2006 | Motegi et al. |
| 2006/0126556 A1* | 6/2006 | Jiang et al. .................. 370/328 |
| 2006/0804343 | 6/2006 | Fong |
| 2006/0805670 | 6/2006 | Novak et al. |
| 2006/0148460 A1 | 7/2006 | Mukherjee et al. |
| 2006/0159045 A1 | 7/2006 | Ananthaiyer et al. |
| 2006/0820683 | 7/2006 | Novak et al. |
| 2006/0820705 | 7/2006 | Novak et al. |
| 2006/0182063 A1 | 8/2006 | Ma et al. |
| 2006/0183497 A1 | 8/2006 | Paranchych et al. |
| 2006/0822018 | 8/2006 | Novak et al. |
| 2006/0203766 A1 | 9/2006 | Kim et al. |
| 2006/0209760 A1* | 9/2006 | Saito et al. .................. 370/331 |
| 2006/0209882 A1 | 9/2006 | Han et al. |
| 2006/0824848 | 9/2006 | Novak et al. |
| 2006/0825360 | 9/2006 | Novak et al. |
| 2006/0240782 A1 | 10/2006 | Pollman et al. |
| 2006/0828312 | 10/2006 | Novak et al. |
| 2006/0829426 | 10/2006 | Novak et al. |
| 2006/0259628 A1 | 11/2006 | Vadlapudi et al. |
| 2006/0264218 A1 | 11/2006 | Zhang et al. |
| 2006/0291420 A1 | 12/2006 | Ng |
| 2006/0294214 A1 | 12/2006 | Chou |
| 2006/0294241 A1 | 12/2006 | Cherian et al. |
| 2007/0022396 A1 | 1/2007 | Attar et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0099632 A1* | 5/2007 | Choksi ............... 455/456.1 |
| 2007/0105527 A1 | 5/2007 | Nylander et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0153750 A1 | 7/2007 | Baglin et al. |
| 2007/0155329 A1 | 7/2007 | Mehrabanzad et al. |
| 2007/0160008 A1 | 7/2007 | Burgess |
| 2007/0197220 A1 | 8/2007 | Willey |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0009328 A1 | 1/2008 | Narasimha |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070574 A1 | 3/2008 | Vikberg et al. |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0273493 A1 | 11/2008 | Fong et al. |
| 2008/0287130 A1 | 11/2008 | Laroia et al. |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0103494 A1 | 4/2009 | Ma et al. |
| 2009/0116445 A1 | 5/2009 | Samar et al. |
| 2009/0129334 A1 | 5/2009 | Ma et al. |
| 2009/0156218 A1 | 6/2009 | Garg et al. |

FOREIGN PATENT DOCUMENTS

| | | |
|---|---|---|
| AU | 1998/84574 | 2/1999 |
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO03/081938 | 10/2003 |
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO 2007/002659 | 1/2007 |
| WO | WO2007/028122 | 3/2007 |
| WO | WO2007/028252 | 3/2007 |
| WO | WO2007/044099 | 4/2007 |
| WO | WO2007/045101 | 4/2007 |
| WO | WO 2007/075446 | 7/2007 |
| WO | WO 2007/078766 | 7/2007 |
| WO | WO2007/078766 | 5/2011 |

OTHER PUBLICATIONS

*Written Opinion of the International Searching Authority*, Patent Cooperation Treaty, Oct. 26, 2006, 8 pages.
Paul Bender, et al., "CDMA/HDR: A Bandwidth-Efficient High-Speed Wireless Data Service for Nomadic Users", IEEE Communications Magazine, Jul. 2000.
Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks- MWIF Contribution, Draft dated Sep. 7, 2000.
*International Search Report*, Patent Cooperation Treaty, Apr. 26, 2007, 10 pages.
*International Search Report*, Patent Cooperation Treaty, Oct. 29, 2002, 5 pages.
International Preliminary Report on Patentability mailed Nov. 27, 2008 in corresponding PCT application No. PCT/US2006/047963 (5pages).
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Search Report and Written Opinion for PCT international application No. PCT/US2006/047524, mailed May 26, 2009 (13 pages).
U.S. Appl. No. 10/848,597, filed May 18, 2004, now U.S. Patent No. 7,170,871, issued Jan. 30, 2007, including application as filed, transaction history from PAIR (PTO website).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
U.S. Appl. No. 11/166,893, filed Jun. 24, 2005, including application as filed, transaction history from PAIR (PTO website), and pending claims.
PCT application No. PCT/US2006/025018 filed Jun. 26, 2006, with Publication No. W02007/044099, including application as filed, transaction history from PAIR (PTO website).
U.S. Appl. No. 11/402,744, filed Apr. 12, 2006, including application as filed, transaction history from PAIR (PTO website), and pending claims.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
TIA/EIA/IS-2001, Interoperability Specification (IOS) for CDMA2000 Network Access Interfaces, Aug. 2001 (revised version of May 2000).
Office action and response history of U.S. Appl. No. 09/891,103 to May 27, 2009.
Office action and response history of U.S. Appl. No. 10/848,597 to May 18, 2004.
Office action and response history of U.S. Appl. No. 11/166,893 to May 27, 2009.
Office action and response history of U.S. Appl. No. 11/037,896 to May 27, 2009.
Office action and response history of U.S. Appl. No. 11/167,785 to May 27, 2009.
Office action and response history of U.S. Appl. No. 11/243,405 to May 27, 2009.
Office action and response history of U.S. Appl. No. 11/303,773 to May 27, 2009.
Office action and response history of U.S. Appl. No. 11/305,286 to Jun. 1, 2009.
Office action and response history of U.S. Appl. No. 11/402,744 to May 27, 2009.
Office action and response history of U.S. Appl. No. 11/955,644 to May 27, 2009.
Office action and response history of U.S. Appl. No. 11/303,773 to Nov. 20, 2009.
Office action and response history of U.S. Appl. No. 11/402,744 to Nov. 30, 2009.
Chinese Office action of Chinese application No. 200580024230.0 mailed Nov. 20, 2009 (4 pages).
Office action and response history of U.S. Appl. No. 11/166,893 to Dec. 8, 2009.
Office action and response history of U.S. Appl. No. 09/891,103 to Dec. 8, 2009.
Office action and response history of U.S. Appl. No. 11/037,896 to Dec. 8, 2009.
Office action and response history of U.S. Appl. No. 11/243,405 to Dec. 8, 2009.
Office action and response history of U.S. Appl. No. 11/486,545 to Dec. 8, 2009.
Office action and response history of U.S. Appl. No. 11/955,644 to Dec. 8, 2009.
Office action and response history of U.S. Appl. No. 11/243,405 to Jan. 6, 2010.
Office action and response history of U.S. Appl. No. 11/037,896 to Jan. 11, 2010.
Office action and response history of U.S. Appl. No. 11/305,286 to Jan. 11, 2010.
Office action and response history of U.S. Appl. No. 11/167,785 to Jan. 11, 2010.
Office action and response history of U.S. Appl. No. 09/891,103 to Dec. 13, 2009.
GB Examination Report for Application No. 0811839.0, mailed Jan. 22, 2010 (2 pages).
Office action and response history of U.S. Appl. No. 11/167,785 to Sep. 22, 2009.
Office action and response history of U.S. Appl. No. 11/243,405 to Nov. 9, 2009.
Office action and response history of U.S. Appl. No. 11/305,286 to Sep. 30, 2009.
Office action and response history of U.S. Appl. No. 11/640,619 to Nov. 9, 2009.
Office action and response history of U.S. Appl. No. 09/891,103 to Nov. 10, 2009.
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
European Patent Office communication and response of European application No. 06836082.5 mailed Jun. 18, 2009 (21 pages).
Office action and response history of U.S. Appl. No. 11/402,744 to Mar. 30, 2010.

Office action and response history of U.S. Appl. No. 11/167,785 to Apr. 28, 2010.
Office action and response history of U.S. Appl. No. 11/305,286 to Jun. 24, 2010.
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
Office action and response history of U.S. Appl. No. 11/303,773 to Jun. 11, 2010.
Office action and response history of U.S. Appl. No. 11/037,896 to Jun. 16, 2010.
Office action and response history of U.S. Appl. No. 11/486,545 to May 28, 2010.
Office action and response history of U.S. Appl. No. 11/243,405 to Jun. 17, 2010.
Office action and response history of U.S. Appl. No. 11/640,619 to Jun. 18, 2010.
Office action and response history of U.S. Appl. No. 11/166,893 to Apr. 13, 2010.
Office action and response history of U.S. Appl. No. 09/891,103 to Jun. 14, 2010.
Office action and response history of U.S. Appl. No. 11/955,644 to Jun. 3, 2010.
Fish & Richardson, P.C., Amendment in reply to Action dated Jun. 16, 2010 in U.S. Appl. No. 11/037,896, dated Jun. 28, 2010, 24 pages.
Examiner Interview Summary in U.S. Appl. No. 11/166,893, dated Jun. 30, 2009, 4 pages.
Australian (AU) Examination Report for Application No. 2005426813, Jun. 4, 2009 (18 pages).
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Office action and response history of U.S. Appl. No. 11/166,893 to Aug. 11, 2009.
Office action and response history of U.S. Appl. No. 11/955,644 to Aug. 11, 2009.
Office action and response history of U.S. Appl. No. 09/891,103 to Aug. 11, 2009.
Office action and response history of U.S. Appl. No. 11/167,785 to Aug. 11, 2009.
Office action and response history of U.S. Appl. No. 11/243,405 to Aug. 11, 2009.
Office action and response history of U.S. Appl. No. 11/305,286 to Aug. 11, 2008.
Office action and response history of U.S. Appl. No. 11/303,773 to Aug. 13, 2009.
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl. No. 11/037,896 to Sep. 17, 2009.
USPTO Notice of Allowance in U.S. Appl. No. 11/486,545, dated Jul. 28, 2010, 8 pages.
Fish & Richardson, P.C., Amendment in Reply to Action dated Mar. 25, 2010 in U.S. Appl. No. 11/166,893, filed Jun. 28, 2010, 19 pages.
USPTO Final Office Action in U.S. Appl. No. 11/305,286, dated Jun. 24, 2010, 39 pages.
Response filed Aug. 9. 2010 to GB Examination Report for Application No. 0811839.0, dated Jun. 3, 2010 (10 pages).
Response filed Aug. 2, 2010 to Chinese office action for Chinese application No. 200580024230.0 dated May 17, 2010 (40 pages).
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
USPTO Office Action in U.S. Appl. No. 11/166,893, dated Sep. 2, 2010, 31 pages.
Fish & Richardson, P.C., Supplemental Amendment in Reply to Action dated Jun. 18, 2010 in U.S. Appl. No. 11/640,619, filed on Oct. 18, 2010, 20 pages.
USPTO Final Office Action in U.S. Appl. No. 11/167,785, dated Oct. 15, 2010, 10 pages.
USPTO Supplemental Notice of Allowance in U.S. Appl. No. 09/891,103, dated Oct. 15, 2010, 4 pages.
Fish & Richardson, P.C., Amendment in Reply to Action dated Jun. 24, 2010 in U.S. Appl. No. 11/305,286, filed on Oct. 25, 2010, 31 pages.
USPTO Final Office Action in U.S. Appl. No. 11/402,744, dated Nov. 12, 2010, 22 pages.
*International Preliminary Report on Patentability* for Application No. PCT/US2005/017385, Dec. 7, 2006, 8 pages.
*International Preliminary Report on Patentability* for Application No. PCT/US2006/024958, Jan. 17, 2008, 7 pages.
*EP Examination Report* for Application No. 06785637.7, Feb. 6, 2008, 2 pages.
U.S. Appl. No. 09/891,103, filed on Jun. 25, 2001, including copy of application as filed, and pending claims.
PCT application No. PCT/US2002/020380 filed on Jun. 25, 2002, with Publication No. WO2003/001820, including copy of application as filed.
PCT application No. PCT/US2005/17385 filed on May 17, 2005, with Publication No. WO2005/115026, including copy of application as filed.
U.S. Appl. No. 11/037,896, filed on Jan. 18, 2005, including copy of application as filed, and pending claims.
U.S. Appl. No. 11/640,619, filed on Dec. 18, 2006, including copy of application as filed.
U.S. Appl. No. 11/167,785, filed on Jun. 27, 2005, including copy of application as filed, and pending claims.
PCT application No. PCT/US2006/24958 filed on Jun. 27, 2006, with Publication No. WO2007/002659, including copy of application as filed.
U.S. Appl. No. 11/243,405, filed on Oct. 4, 2005, including copy of application as filed, and pending claims.
U.S. Appl. No. 11/303,773, filed on Dec. 16, 2005, including copy of application as filed, and pending claims.
U.S. Appl. No. 11/305,286, filed on Dec. 16, 2005, including copy of application as filed.
PCT application No. PCT/US2006/47524 filed on Dec. 13, 2006, with Publication No. WO2007/078766, including copy of application as filed.
PCT application No. PCT/US2006/47963 filed on Dec. 15, 2006, with Publication No. WO2007/075446, including copy of application as filed.
U.S. Appl. No. 11/955,644, filed on Dec. 13, 2007, including copy of application as filed.
International Search Report and Written Opinion mailed Sep. 26, 2008 in corresponding PCT application No. PCT/US2006/47963 (9 pages).
Notice of Allowability in U.S. Appl. No. 11/486,545, dated Nov. 8, 2010, 6 pages.
Examiner Interview Summary in U.S. Appl. No. 11/166,893, dated Dec. 17, 2010, 3 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed on Feb. 14, 2011, 12 pages.

Japanese Office action of application No. 2007-527408 issued Nov. 24, 2010, mailed Nov. 29, 2010 with English translation (21 pages).

Fish & Richardson, P.C., Amendment in Reply to Office Action dated Sep. 2, 2010 in U.S. Appl. No. 11/166,893, filed on Jan. 3, 2011, 18 pages.

USPTO Notice of Allowance in U.S. Appl. No. 11/166,893, dated Mar. 18, 2011, 21 pages.

Notice of Allowability in U.S. Appl. No. 11/486,545, dated Mar. 11, 2011, 9 pages.

USPTO Supplemental Notice of Allowance in U.S. Appl. No. 09/891,103, dated Mar. 14, 2011, 6 pages.

USPTO Non-Final Office Action in U.S. Appl. No. 11/402,744, dated Apr. 1, 2011, 14 pages.

Notice of Allowance in U.S. Appl. No. 11/303,773, dated Apr. 15, 2011, 6 pages.

USPTO Supplemental Notice of Allowance in U.S. Appl. No. 11/166,893, dated Apr. 22, 2011, 17 pages.

International Preliminary Report on Patentability for PCT international application No. PCT/US2006/047524, mailed Apr. 28, 2011 (8 pages).

Notice of Allowance in U.S. Appl. No. 11/037,896, dated May 17, 2011, 8 pages.

Response filed May 30, 2011 to Japanese Office action issued in application No. 2007-527408, Nov. 24, 2010, mailed Nov. 29, 2010 (31 pages).

Fish & Richardson, P.C., Amendment in Reply to Office Action dated Apr. 1, 2011 in U.S. Appl. No. 11/402,744, filed on Jun. 30, 2011, 13 pages.

USPTO Notice of Allowance in U.S. Appl. No. 11/486,545, dated Jul. 18, 2011, 10 pages.

USPTO Final Office Action in U.S. Appl. No. 11/402,744, dated Oct. 6, 2011, 14 pages.

Non Final Office Action in U.S. Appl. No. 11/037,896, dated Oct. 20, 2011, 28 pages.

* cited by examiner

RADIO NETWORK COMMUNICATION

CROSS-REFERENCE TO RELATED APPLICATIONS

This application is related to U.S. application Ser. Nos. 11/037,896 filed on Jan. 18, 2005, 09/891,103, filed on Jun. 25, 2001, 10/848,597, filed on May 18, 2004, and 11/243,405, filed on Oct. 4, 2005, all of which are incorporated herein by reference.

This application is also related to U.S. application Ser. No. 11/303,773, titled "Radio Frequency Dragging Prevention," and U.S. application Ser. No. 11/305,286, titled "Radio Network Control," being filed concurrently with the present application, which are also incorporated herein by reference.

TECHNICAL FIELD

This description relates to radio network communication.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1x) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

An EVolution of the current 1xRTT standard for high-speed data-only (DO) services, also known as the 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005. Revision A is also incorporated herein by reference.

Figure 1:
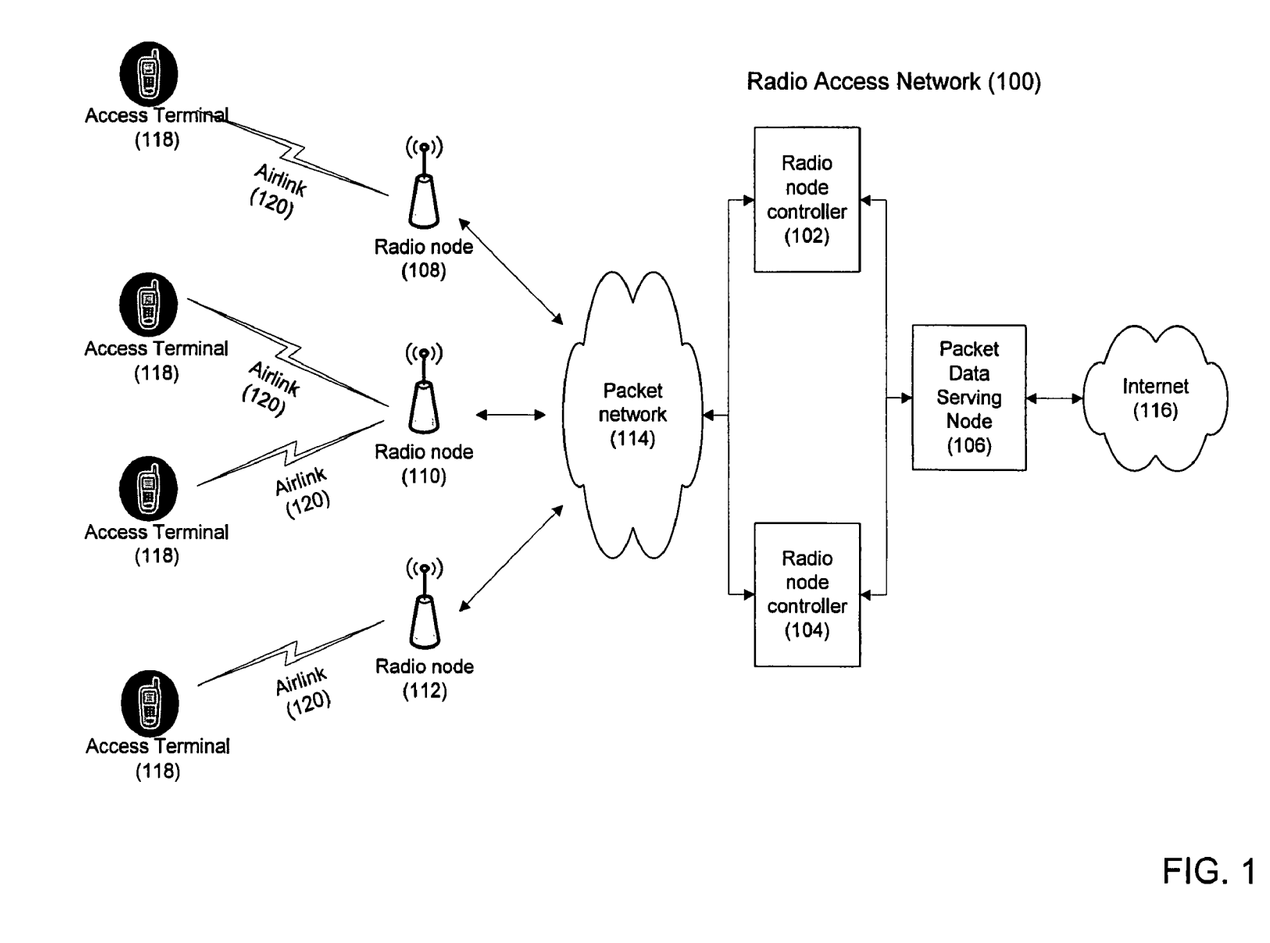
FIGS. 1-2 each show a radio access network.

FIG. 1 shows a 1xEV-DO radio access network 100 with radio node controllers 102 and 104 connected to radio nodes 108, 110, and 112 over a packet network 114. The packet network 114 can be implemented as an IP-based network that supports many-to-many connectivity between the radio nodes and the radio node controllers. The packet network 114 is connected to the Internet 116 via a packet data serving node 106. Other radio nodes, radio node controllers, and packet networks (not shown in FIG. 1) can be included in the radio access network 100. The packet network 114 may be several distinct networks connecting individual radio node controllers to their associated radio nodes, or it may be a single network as shown in FIG. 1, or a combination.

Typically, each radio node controller controls 25-100 radio nodes and each radio node supports 1-4 carriers each of 1.25 MHz of bandwidth. A carrier is a band of radio frequencies used to establish airlinks with access terminals. The geographic area of the radio access network that is served by any given radio node is referred to as a cell. Each cell can be divided into multiple sectors (typically 3 or 6) by using multiple sectorized antennas (the term "sector" is used both conventionally and in this document, however, even when there is only one sector per cell).

Access terminals 118 communicate with the network 100 over airlinks 120. Each access terminal may be a cellular phone, a laptop computer, a Personal Digital Assistant (PDA), a dual-mode voice/data handset, or another device, with built-in 1xEV-DO Rev-0 or Rev-A support. The airlink 120 between the network 100 and an access terminal 118 includes a control channel over which a serving radio node controller (i.e., the radio node controller on which a 1xEV-DO session of the access terminal 118) transmits messages and parameters that the access terminal 118 may need for access and paging operations. The messages and parameters (collectively referred to in this description as "control channel messages") convey system parameters, access parameters, neighbor lists, paging messages, and channel assignment information to the access terminal 118.

Figure 2:
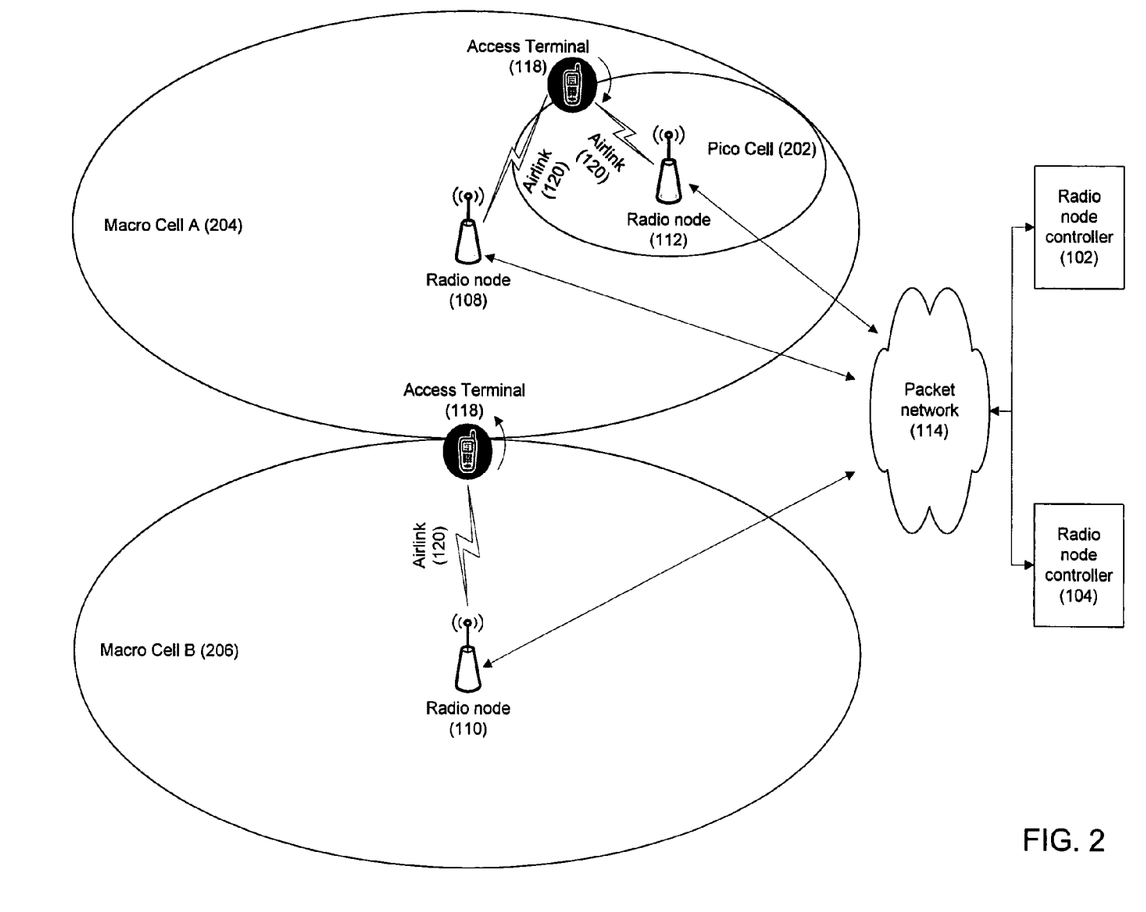

FIG. 2 shows a network coverage area corresponding to the 1xEV-DO radio access network 100. In this example, the radio nodes serve coverage areas of different sizes. The large coverage areas served by radio nodes 108 and 110 are referred to as macro cells, while the smaller coverage areas served by radio node 112 is referred to as a pico cell. A macro cell covers a very large geographic area; for example, the metropolitan area of a city. A pico cell generally has a much smaller coverage area; for example, a single office building. The coverage area of a pico cell may partially or completely overlap the coverage area of a macro cell. The pico cell within the coverage area of the macro cell may operate on the same or different carrier frequency. An access terminal 118 in the pico cell coverage area may access the network either through the macro cell radio node 108 or the pico cell radio node 112. Accessing the network through the pico cell radio node 112 conserves the network resources of the macro cell and vice versa.

There are a number of different techniques that may be implemented by the 1xEV-DO radio access network 100 to determine when a handoff between the radio nodes of over-lapping pico and macro cells is to take place. One example technique involves installing, in the coverage area of the macro cell radio node, a pilot beacon that transmits a pilot signal on the same carrier frequency as that of the macro cell radio node 108. A handoff can be triggered by the network upon detection of a carrier frequency change. However, these pilot beacons do not provide any actual carrier service to an access terminal and are therefore very limited in application. Additionally installation of each pilot beacon can be very expensive. Another example technique involves configuring an access terminal to constantly assume the presence of a pico cell and attempt to connect to it. However, such constant activity is very draining on the limited access terminal resources, including the access terminal's battery. Furthermore, this technique does not enable the network to determine instances in which it may be more beneficial to serve the access terminal via the macro cell radio node, although weaker pico cell signals may be available.

SUMMARY

In general, in one aspect, a radio access network causes an access terminal in communication with the radio access network to send an update including information about a location of the access terminal.

Implementations may include one or more of the following features. The radio access network causes the access terminal to send the update by broadcasting trigger information. The trigger information comprises a trigger that is specific to a cell of the radio access network. The radio access network causes the access terminal to send the update by unicasting query information. The query information comprises a query that is specific to a cell of the radio access network. The query information comprises a query that is specific to a carrier frequency on which a radio node of the radio access network or a different radio access network operates. The information comprises information about one or more radio nodes each operating on a carrier frequency on which the access terminal operates. The information comprises information about one or more radio nodes, at least one of which operates on a carrier frequency other than a carrier frequency on which the access terminal operates. The information comprises a sector identifier and a pilot strength associated with a sector of a macro cell. The information comprises a sector identifier and a pilot strength associated with a sector of a pico cell. The radio access network uses the information sent by the access terminal to determine whether a handoff between cells of the radio access network is to be performed.

In general, in one aspect, an access terminal performs a comparison of a recently-received cell-specific identifier with a previously-received cell-specific identifier; and takes action as a result of the comparison.

Implementations may include one or more of the following features. Each of the recently-received cell-specific identifier and the previously-received cell-specific identifier comprises a cell-specific route update trigger code. Taking action comprises sending a message to a radio access network. The message comprises a pilot strength of at least one sector of the radio access network that is visible to the access terminal. Taking action comprises replacing the previously-received cell-specific identifier with the recently-received cell-specific identifier.

In general, in one aspect, when an access terminal is communicating with a first cell of a network and is within a service area of both the first cell of the network and a second cell of the network, the network determines when to initiate a handoff of the access terminal from the first cell to the second cell.

Implementations may include one or more of the following features. The first cell comprises a macro cell and the second cell comprises a pico cell. The first cell comprises a pico cell and the second cell comprises a macro cell. The network initiates the handoff of the access terminal from the first cell to the second cell. The network maintains a communication channel of the access terminal. The network sends a TrafficChannelAssignment message. The network closes a communication channel of the access terminal The networks sends a Unicast Redirect message. The network uses information about the location of the access terminal. The information comprises a sector identifier of the first cell. The the information comprises a sector identifier of the second cell. The information comprises a pilot strength associated with a sector of the first cell. The information comprises a pilot strength associated with a sector of the second cell. The network compares the pilot strength of the first cell with the pilot strength of the second cell. The first cell and the second cell both operate on a common carrier frequency. The first cell operates on a carrier frequency and the second cell operates on a different carrier frequency Advantages that can be seen in particular implementations of the invention include one or more of the following. When a macro and pico cell are controlled by the same radio network controller, the access terminal can be redirected from one to the other without experiencing an interruption in service. Allowing an access terminal to use the local resources of a pico cell when possible conserves the resources of the macro cell. The access terminal is also able to conserve its resources and battery power. Additionally, by implementing the techniques in the form of software that is easy to update as new cells are added to the radio access network and additional carrier frequencies are supported by the radio access network, the network operator does not have to install expensive hardware, such as pilot beacons, in the network in order to determine when handoffs between macro and pico cells are to be performed.

The details of one or more embodiments of the invention are set forth in the accompanying drawings and the description below. Other features, objects, and advantages of the invention will be apparent from the description and drawings, and from the claims.

DETAILED DESCRIPTION

In some implementations, the 1xEV-DO network 100 of FIG. 1 supports a triggering mechanism that enables the network to cause an access terminal, in communication with the network, to send an update with information about the access terminal's location.

In the examples to follow, this triggering mechanism is used to facilitate handoffs between macro and pico cells within the coverage area of the network, where the macro cell radio nodes operate on carrier frequency C1 and the pico cell radio nodes operate on carrier frequency C2. In some cases, the macro cell and the pico cell are homed to the same radio node controller. In those cases in which the macro cell and the pico cell are homed to different radio node controllers, the network 100 of FIG. 1 may be implemented with a multi-homing architecture (e.g., as described in U.S. application Ser. No. 11/305,286, titled "Radio Network Control,") or a clustering architecture.

In other examples, the triggering mechanism is used for a variety of other applications, such as hard handoffs and multi-carrier traffic allocations. The triggering mechanism can also be used in networks that implement radio frequency dragging prevention techniques, such as those described in U.S. application Ser. No. 11/303,773, titled "Radio Frequency Dragging Prevention."

Figure 3:
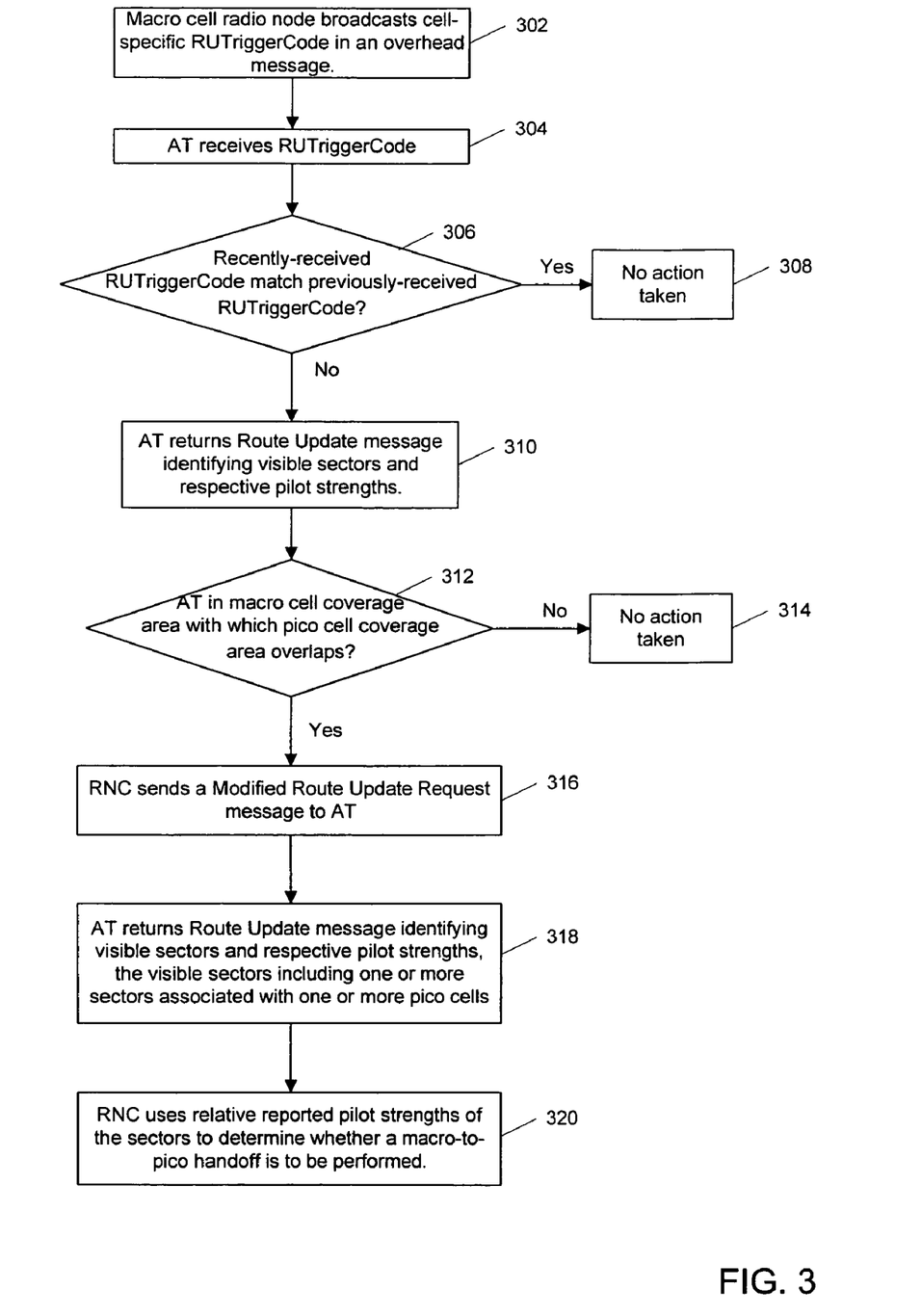
FIG. 3 shows a flowchart of a macro-pico handoff determination process.

Referring to FIGS. 1-3, in some examples, each radio node controller of the 1xEV-DO network 100 of FIG. 1 has (or has access to) information about all of the operational pico cell(s) in the network 100. The information includes each pico cell's carrier frequency, PN Offset, and the macro cell(s) with which the pico cell's coverage area overlaps. The radio node of each macro cell with which a pico cell's coverage area overlaps is configured to periodically broadcast a cell-specific Route Update Trigger Code ("RUTriggerCode") in overhead messages transmitted on the control channels of the macro cell radio node (302).

Each idle access terminal 118 periodically monitors a control channel of its serving radio node for overhead messages. Upon receipt (304) of an overhead message containing the cell-specific RUTriggerCode, the access terminal 118 compares (306) the recently-received RUTriggerCode with a RUTriggerCode stored in its memory. The RUTriggerCode stored in memory corresponds to the macro cell radio node that last served the access terminal. If the comparison yields a match, no action is taken (308). A non-match serves as an indicator that the idle access terminal has entered the coverage area of a new macro cell, and triggers the idle access terminal to send (310) a Route Update message back to the network by way of the macro cell radio node 108. The Route Update message typically identifies, to the radio node controller 102, the sectors that are visible to the idle access terminal, and for each visible sector, its associated pilot strength. The visible sectors generally include sectors of radio nodes that are operating on the same carrier frequency C1 as that of the idle access terminal. The sector identification and the relative pilot strengths enable the radio access network to keep track of the access terminal's approximate location within the footprint of the network. For example, if the idle access terminal 118 moves from the coverage area of macro cell B 206 into the coverage area of macro cell A 204, where the radio nodes 108, 110 of both macro cells operate on the same carrier frequency C1, the idle access terminal will report, as visible, the sectors of the macro cell radio node 108 in its Route Update message.

The radio node controller examines each Route Update message it receives to determine (312) whether the idle access terminal is in the coverage area of a macro cell with which a pico cell's coverage area overlaps. To do so, the serving radio node controller compares the sector identification information provided in the Route Update message with the information it has about the operational pico cell(s) within the network. If the determination yields a negative result (i.e., no pico cells within the coverage area of the macro cell 108), no action is taken (314). If the determination yields a positive result (i.e., there are one or more pico cells within the coverage area of the macro cell 108), the radio node controller sends (316) a specific query (referred to in this description as a Modified Route Update Request) to the access terminal. The query can be made on the access terminal's paging cycle to avoid excessive use of network resources. This query typically relates to those specific pico cells that are within the coverage area of the macro cell, including those pico cells having radio nodes that are operating on a different carrier frequency C2 than that of the macro cell radio node.

Upon receipt of the Modified Route Update Request, the idle access terminal will return (318) a Route Update message. In this Route Update message, the idle access terminal reports not only the sectors of radio nodes that are operating on the same carrier frequency C1 as that of the idle access terminal, but also the radio nodes that are operating on a different carrier frequency C2. In this manner, the network is made aware of the signal strengths of the sectors of pico cell radio nodes operating on a different carrier frequency C2 that are visible to the access terminal.

In instances in which the idle access terminal is at or near the boundary of a pico cell coverage area, the Route Update message will likely identify, as visible, one or more sectors associated with the pico cell radio node and one or more sectors associated with the macro cell radio node. The radio node controller uses the relative reported signal strengths to determine whether a macro-to-pico handoff is to be performed (320). In some implementations, the radio node controller examines the reported pilot strengths of each pico cell radio node to determine whether any one of the reported pilot strengths exceeds a configurable threshold for a configurable number of times. Generally, the network operator sets the configurable values such that macro-to-pico handoffs are not triggered when the macro cell coverage is sufficiently strong. By continuously evaluating which radio node would most efficiently serve the idle access terminal, handoffs can be reduced or minimized to those instances in which a macro-to-pico handoff would provide for efficient network resource utilization.

In some implementations, once a determination is made to trigger a macro-to-pico handoff, the radio node controller sends a Unicast Redirect message to the access terminal. Upon receipt of the message, the idle access terminal processes the Unicast Redirect message to seamlessly transition from the carrier on which it operates to the carrier frequency specified in the Unicast Redirect message. In this case, the idle access terminal operating on the carrier frequency C1 will operate on the carrier frequency C2 after the Unicast Redirect message is processed. The user disruption associated with the "switch carrier" process typically averages about 100-500 ms long and is not typically noticeable by the access terminal user, especially when the access terminal is idle.

In the case of an active access terminal in the coverage area of a macro cell 108, the active access terminal can be configured to send a Route Update message to the network when the pilot strength associated with the macro cell radio node 108 exceeds the Pilot_Add threshold. The Route Update message identifies, to the radio node controller 102, the sectors operating on carrier frequency C1 that are visible to the active access terminal, and for each visible sector, its associated pilot strength (310).

The radio node controller examines each Route Update message it receives to determine whether the active access terminal is in the coverage area of a macro cell with which a pico cell's coverage area overlaps in the same manner described above with reference to the idle access terminal example (314). If the determination is made that there are one or more pico cells within the coverage area of the macro cell, the radio node controller sends a Modified Route Update Request to the active access terminal (316), which returns the pilot strengths of the visible sectors of the one or more pico cells operating on carrier frequency C2 (318).

The radio node controller uses the relative reported signal strengths to determine whether a macro-to-pico handoff is to be performed (320). In the implementations in which the macro cell and the pico cell are homed to the same vendor, the radio node controller examines the reported pilot strengths of each pico cell radio node to determine whether any one of the reported pilot strengths satisfies a condition (e.g., exceeds a configurable threshold for a configurable number of times). The pico cell associated with the reported strength that satisfies the condition is referred to as the target pico cell. Once a determination is made to trigger a macro-to-pico handoff, the radio node controller allocates airlink resources for the radio node of the target pico cell, and sends a TrafficChannelAssignment message to the active access terminal over the control channel of each of the visible sectors associated with the target pico cell. Upon receipt of the TrafficChannelAssignment message, the active access terminal processes the TrafficChannelAssignment message to seamlessly transition from the carrier on which it operates to the carrier frequency C2 of the target pico cell while remaining active.

In the implementations in which the macro and pico cells are homed to different vendors, the radio node controller determines when a macro-to-pico handoff is to be triggered as described above, then sends a Unicast Redirect message to the active access terminal to effect the handoff. The access terminal closes its current connection with the network via the macro cell's radio node and opens a new connection with the network via the target pico cell's radio node. The user disruption associated with the "close connection-open connection" process typically averages about 1 second long.

The triggering mechanism can also be used to facilitate a transition from a pico cell to the macro cell. Generally, once an access terminal has transitioned to a local pico cell, it will continue to access the network via the pico cell node while it remains parked, or within the coverage area of that pico cell. Once the access terminal becomes mobile, moving out of the coverage area of the pico cell, it will transition back to the macro cell.

An idle or active access terminal in the coverage area of a pico cell will periodically report the pilot strengths of visible sectors to the network using a Route Update Message. In the idle case, the pico cell can include the macro cell's sector identification in its neighbor list, as described in U.S. application Ser. No. 11/303,733 titled "Radio Frequency Dragging Prevention". In those instances in which the radio node controller determines that the reported pilot strength of the serving pico cell radio node is below a configurable threshold (or the reported pilot strength of a macro cell radio node is exceeds a configurable threshold) for a configurable number of times, the radio node controller sends a Unicast Redirect message to the access terminal to effect pico-to-macro handoff that involves a carrier frequency change from C2 (that of the pico cell radio node) to C1 (that of the macro cell radio node). In the active case, the radio node controller sends a TrafficChannelAssignment message to the access terminal to effect a seamless pico-to-macro handoff between cells homed to the same vendor. When the cells are homed to different vendors, a Unicast Redirect message can be used, resulting in a brief disruption of service.

Although the techniques described above employ the 1xEV-DO air interface standard, the techniques are also applicable to other CDMA and non-CDMA air interface technologies involving handoffs or multi-carrier traffic allocation.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention, and, accordingly, other embodiments are within the scope of the following claims.

What is claimed is:

1. A method performed by a radio network controller of a radio access network when an access terminal is in communication with a macro cell radio node of the radio access network and the access terminal is within a service area of the macro cell radio node and a service area of a private access point of the radio access network, the service area of the macro cell radio node and the service area of the private access point overlapping one another, the method comprising:

receiving first information from the access terminal;

comparing at least part of the first information with private access point location information to determine whether one or more private access points are within the coverage area of the macro cell radio node;

causing a request to be sent to the access terminal upon a determination that one or more private access points are within the coverage area of the macro cell radio node, wherein the request is configured to obtain second information from the access terminal;

determining whether to initiate a handoff of the access terminal from the macro cell radio node to the private access point by using at least part of the second information provided by the access terminal in response to the request; and sending a signal to the access terminal that initiates the handoff if the radio network controller determines to handoff the access terminal from the macro cell radio node to the private access point.

2. The method of claim 1, wherein the macro cell radio node and the private access point operate on different carrier frequencies.

3. The method of claim 1, wherein the macro cell radio node and the private access point operate on a common carrier frequency.

4. The method of claim 1, wherein the first information was sent by the access terminal in response to a RUTrigger message.

5. The method of claim 1, wherein the first information comprises signal strengths.

6. The method of claim 1, wherein the first information comprises a signal strength of the macro cell radio node.

7. The method of claim 1, wherein the request is sent via a radio node.

8. The method of claim 7, wherein the radio node comprises the macro cell radio node.

9. The method of claim 1, further comprising:
initiating the handoff.

10. The method of claim 1, wherein the first information comprises location information from the access terminal; and
wherein the second information comprises additional location information from the access terminal about at least one private access point having a service area that overlaps the service area of the macro cell radio node.

11. The method of claim 10, wherein the at least one private access point comprises any private access points operating on a same carrier frequency as the macro cell radio node.

12. The method of claim 10, wherein the at least one private access point further comprises any private access points operating on a different carrier frequency as the macro cell radio node.

13. The method of claim 10, wherein the location information comprises a signal strength of a sector of the private access point.

14. The method of claim 1, wherein the second information comprises a signal strength of a sector of at least one private access point having a service area that overlaps the service area of the macro cell radio node.

15. The method of claim 1, wherein the at least one private access point comprises the private access point.

16. A radio network controller, comprising:
a processor; and
memory for storing instructions that are executable by the processor when an access terminal is in communication with a macro cell radio node of the radio access network and the access terminal is within a service area of the macro cell radio node and a service area of a private access point of the radio access network, the service area of the macro cell radio node and the service area of the private access point overlapping one another, the instructions to:
receive first information from the access terminal;
compare at least part of the first information with private access point location information to determine whether one or more private access points are within the coverage area of the macro cell radio node;
cause a request to be sent to the access terminal upon a determination that one or more private access points are within the coverage area of the macro cell radio node, wherein the request is configured to obtain second information from the access terminal;
determine whether to initiate a handoff of the access terminal from the macro cell radio node to the private access point by using at least part of the second information provided by the access terminal in response to the request; and
send a signal to the access terminal that initiates the handoff if the radio network controller determines to handoff the access terminal from the macro cell radio node to the private access point.

17. A machine-readable storage medium storing instructions, the machine-readable storage medium being a tangible medium, the instructions being executable by a processor on a radio network controller when an access terminal is in communication with a macro cell radio node of the radio access network and the access terminal is within a service area of the macro cell radio node and a service area of a private access point of the radio access network, the service area of the macro cell radio node and the service area of the private access point overlapping one another, the instructions to:
receive first information from the access terminal;
compare at least part of the first information with private access point location information to determine whether one or more private access points are within the coverage area of the macro cell radio node;
cause a request to be sent to the access terminal upon a determination that one or more private access points are within the coverage area of the macro cell radio node, wherein the request is configured to obtain second information from the access terminal;
determine whether to initiate a handoff of the access terminal from the macro cell radio node to the private access point by using at least part of the second information provided by the access terminal in response to the request; and
send a signal to the access terminal that initiates the handoff if the radio network controller determines to handoff the access terminal from the macro cell radio node to the private access point.

18. A method performed by a radio network controller of a radio access network when an access terminal is in communication with a private access point of the radio access network and the access terminal is within a service area of the private access point and a service area of a macro cell radio node of the radio access network, the service area of the private access point and the service area of the macro cell radio node overlapping one another, the method comprising:
receiving first information from the access terminal;
comparing at least part of the first information with private access point location information to determine whether one or more private access points are within the coverage area of the macro cell radio node;
causing a trigger message to be sent to the access terminal upon a determination that one or more private access points are within the coverage area of the macro cell radio node;
receiving second information from the access terminal in response to the trigger message, the second information comprising a signal strength of the private access point and a signal strength of the macro cell radio node; and
determining whether to initiate a handoff of the access terminal from the private access point to the macro cell radio node by:
comparing the signal strength of the private access point to the signal strength of the macro cell radio node; and
if the signal strength of the private access point is below a first threshold or the signal strength of the macro cell radio node is above a second threshold, then:
initiating the handoff by sending a signal to the access terminal.

19. A radio network controller, comprising:
a processor; and
memory for storing instructions that are executable by the processor when an access terminal is in communication with a private access point of the radio access network and the access terminal is within a service area of the private access point and a service area of a macro cell radio node of the radio access network, the service area of the private access point and the service area of the macro cell radio node overlapping one another, the instructions to:

receive first information from the access terminal;

compare at least part of the first information with private access point location information to determine whether one or more private access points are within the coverage area of the macro cell radio node;

cause a trigger message to be sent to the access terminal upon a determination that one or more private access points are within the coverage area of the macro cell radio node;

receive second information from the access terminal in response to the trigger message, the second information comprising a signal strength of the private access point and a signal strength of the macro cell radio node; and determine whether to initiate a handoff of the access terminal from the private access point to the macro cell radio node by:

comparing the signal strength of the private access point to the signal strength of the macro cell radio node; and, if the signal strength of the private access point is below a first threshold or the signal strength of the macro cell radio node is above a second threshold, then:

initiating the handoff by sending a signal to the access terminal.

20. A machine-readable storage medium storing instructions, the machine-readable storage medium being a tangible medium, the instructions being executable by a processor on a radio network controller when an access terminal is in communication with a private access point of the radio access network and the access terminal is within a service area of the private access point and a service area of a macro cell radio node of the radio access network, the service area of the private access point and the service area of the macro cell radio node overlapping one another, the instructions to:

receive first information from the access terminal;

compare at least part of the first information with private access point location information to determine whether one or more private access points are within the coverage area of the macro cell radio node;

cause a trigger message to be sent to the access terminal upon a determination that one or more private access points are within the coverage area of the macro cell radio node;

receive second information from the access terminal in response to the trigger message, the second information comprising a signal strength of the private access point and a signal strength of the macro cell radio node; and determine whether to initiate a handoff of the access terminal from the private access point to the macro cell radio node by:

comparing the signal strength of the private access point to the signal strength of the macro cell radio node; and, if the signal strength of the private access point is below a first threshold or the signal strength of the macro cell radio node is above a second threshold, then:

initiating the handoff by sending a signal to the access terminal.

* * * * *

UNITED STATES PATENT AND TRADEMARK OFFICE
CERTIFICATE OF CORRECTION

| | | |
|---|---|---|
| PATENT NO. | : 8,145,221 B2 | |
| APPLICATION NO. | : 11/303774 | |
| DATED | : March 27, 2012 | |
| INVENTOR(S) | : Deepak Garg et al. | |

It is certified that error appears in the above-identified patent and that said Letters Patent is hereby corrected as shown below:

Column 8, Line 60, In Claim 1, delete "handoff the" and insert -- handoff of the --, therefor.

Column 9, Line 64, In Claim 16, delete "handoff the" and insert -- handoff of the --, therefor.

Column 10, Line 26-27, In Claim 17, delete "handoff the" and insert -- handoff of the --, therefor.

Signed and Sealed this
Fifth Day of June, 2012

David J. Kappos
*Director of the United States Patent and Trademark Office*